BEST AVAILABLE COPY

2 Sheets—Sheet 1.

O. EDWARDS.

OIL-STOVES.

No. 7,369.

Reissued Oct. 31, 1876.

WITNESSES

Ed. S. Wellingham

Albert M. Bright

INVENTOR

Oliver Edwards,

By Pieggett and Pieggett

ATTORNEYS.

2 Sheets—Sheet 2.

O. EDWARDS.

OIL-STOVES.

No. 7,369. Reissued Oct. 31, 1876.

WITNESSES

Ed. S. Hollingham.

Albert H. Bright.

INVENTOR

Olivier Edwards

By Siggett & Siggett

ATTORNEYS

BEST AVAILABLE COPY

UNITED STATES PATENT OFFICE.

OLIVER EDWARDS, OF FLORENCE, MASSACHUSETTS.

IMPROVEMENT IN OIL-STOVES.

Specification forming part of Letters Patent No. 179,542, dated July 4, 1876; reissue No. 7,369, dated October 31, 1876; application filed September 29, 1876.

*To all whom it may concern:*

Be it known that I, OLIVER EDWARDS, of Florence, in the county of Hampshire and State of Massachusetts, have invented certain new and useful Improvements in Oil-Stoves; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My invention relates to certain improvements on my patent, dated April 25, 1876, for stoves for burning hydrocarbon oils.

Figure 1:
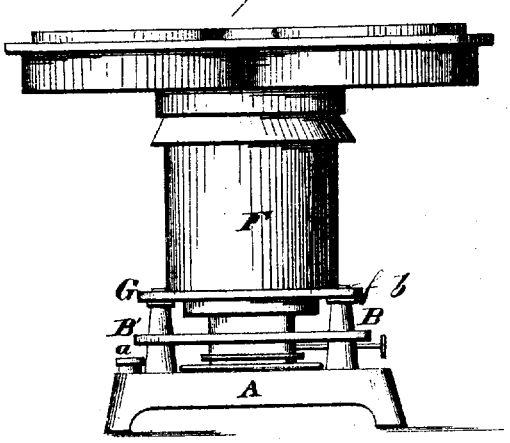
Figure 2:
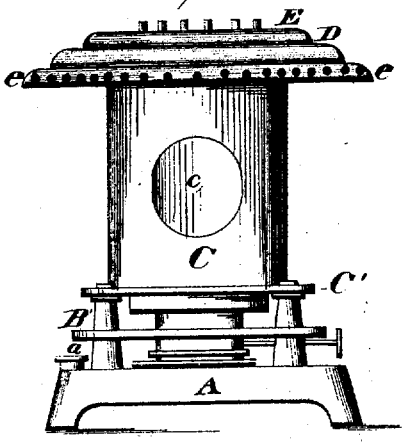
Figure 3:
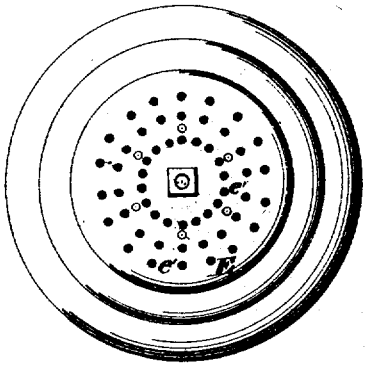
Figure 4:
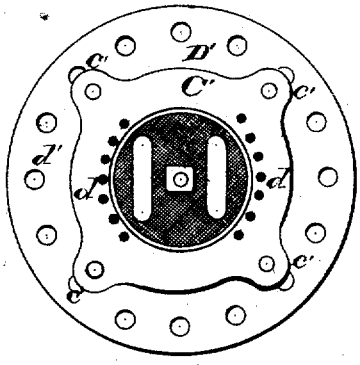
Figure 5:
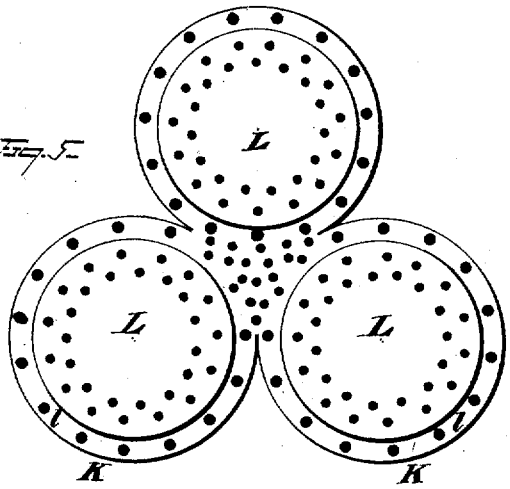
Figure 6:
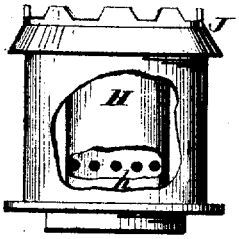

In the accompanying drawings, wherein like letters designate like parts, Figure 1 is a side elevation of the stove as constructed for cooking purposes. Fig. 2 is a side elevation of the stove with the heating or illuminating stove attached thereto. Fig. 3 is a plan view of the heating-drum. Fig. 4 shows the under side of the heating-drum. Fig. 5 is a plan view of the top of the cooking-stove. Fig. 6 shows the perforated chimneys or flues.

My invention consists in certain details of construction and combinations of parts, as hereinafter described and claimed.

In the drawings, A represents the oil-reservoir, which may be made of cast or sheet metal, as desired, and *a* is an opening for filling the reservoir. B are zinc standards for supporting the plate B′. The standards are formed with shoulders *b* at their upper ends for the reception of the base-plate of either the cooking or heating drum.

The construction of the oil-stove constitutes no part of my present invention, as the same is fully described and claimed in my patent dated April 25, 1876.

C is the heating-drum, provided with mica at *c c* to afford proper illumination. The base-plate C′ is perforated at *c′*, whereby it may be removably secured to the zinc standards B, and said plate is perforated at *d* for the purpose of admitting oxygen to the flame within the drum. The top D is formed hollow, and of greater diameter than the heating-drum, so that an annular flange projects over the wall of the drum. The lower plate D′ of top D is provided with perforations *d′* or openings between it and its cap, through which a portion of the heated air passes downwardly toward the base or floor, instead of rising directly up, causing the hot air to pass downward before ascending, instead of being allowed to pass away unused. The outer edge of the hollow top D is perforated at *e*, to establish an outward current of heated air to heat that portion of the top that projects beyond the wall of the heating-drum. Studs or pins are secured to the upper plate E of top D, and serve to sustain any vessel clear from contact with the upper plate, while the heated air from the drum has free access to such vessel through the perforations *e′* in the upper plate E.

In a heating-stove constructed as above described the heat generated by the hydrocarbons is most effectually utilized, as it is first deflected against the inner surface of the drum. It then passes upwardly and flows into the hollow top, from which a portion of the heat passes out through openings in the periphery of the top, and thereby imparts heat to that part of the top which projects from the heating-drum, while the remaining portion of heat generated flows upwardly through the perforated plate, and may be thereafter utilized for warming or cooking purposes, as heretofore set forth.

In order to readily convert the heating-stove into a cooking-stove, I construct a cylinder, F, with a base-plate, G, provided with holes *f*, arranged to register with the zinc standards B, and by removing the heating-drum the cooking-drum may be readily placed on, and secured to, the oil-stove. Chimneys or flues H, corresponding in number and size to the wicks used, are arranged within the cooking-drum F, and said flues are perforated at *h*, to admit oxygen to the flame at the point of combustion, the air entering the drum through perforations in the base-plate G. The upper edge of the cylinder or drum F is formed with projections *j*, which serve as supports for any vessel, when but a single vessel needs heating. To provide for the heating of two or more vessels I place the hollow perforated top J, of cast or sheet metal, on the cooking-drum, and said top J is formed with two or more open-

BEST AVAILABLE COPY ings, K, in which kettles or other receptacles are placed. Each opening K is furnished with a perforated cover or lid, L, and about each opening the top is perforated, as at *l*, whereby the heated air is effectually disposed over the entire surface of the hollow top as it takes its exit from the cooking drum or cylinder.

The cooking-stove may be thus used to heat one or more vessels, and may be readily converted into a heating-stove by simply removing the cooking drum or cylinder and replacing the heating-drum.

Having fully described my invention, what I claim as new, and desire to secure by Letters Patent, is—

1. The combination, with the cooking-drum of an oil-stove, of a hollow perforated top, having a depending flange for its attachment to the drum, and provided with openings for the reception of two or more kitchen utensils, and with covers or lids for said openings, substantially as and for the purpose set forth.

2. The combination, with the heating-drum C of an oil-stove, of a removable hollow top, D, its lower flange projecting beyond the drum C, and at right angles thereto, said flange provided with openings or perforations in its under surface, whereby a portion of the heat is deflected against, and radiated from, the outer surface of the cylinder D, substantially as and for the purpose set forth.

3. The combination, with the heating-drum C of an oil-stove, of a removable hollow top, D, perforated at top, sides, and bottom, substantially as and for the purpose described.

4. In an oil-stove, the combination, with a removable perforated hollow top, of two or more perforated lids or covers, L, substantially as and for the purpose specified.

5. The combination, with the heating-drum of an oil-stove, of a hollow top having a perforated upper plate, provided with studs or pins, substantially as and for the purpose set forth.

6. In an oil-stove, a removable hollow top, perforated about two or more openings, adapted to receive kitchen utensils, substantially as set forth.

7. In an oil cook-stove, a hollow top provided with openings for the reception of two or more cooking utensils, and lids for the same, and also having openings for the passage of the products of combustion, whereby the latter may not be checked when the lids are seated, substantially as described.

In testimony that I claim the foregoing I have hereunto set my hand.

OLIVER EDWARDS.

Witnesses:
H. P. DIBBLE,
WM. H. CUMMINGS.